United States Patent [19]

Althoff et al.

[11] Patent Number: 4,854,805
[45] Date of Patent: Aug. 8, 1989

[54] APPARATUS FOR TRANSPORTING LOADS

[75] Inventors: Karl-Heinz Althoff, Bad Oeynhausen; Werner Kunick, Löhne; Manfred Munstermann; Uwe Voss, both of Bad Oeynhausen, all of Fed. Rep. of Germany; Werner Glanz, Edmonton, Canada

[73] Assignee: O & K Orenstein & Koppel AG, Dortmund, Fed. Rep. of Germany

[21] Appl. No.: 112,567

[22] PCT Filed: Oct. 22, 1986

[86] PCT No.: PCT/EP86/00609
§ 371 Date: Sep. 4, 1987
§ 102(e) Date: Sep. 4, 1987

[87] PCT Pub. No.: WO87/03862
PCT Pub. Date: Jul. 2, 1987

[30] Foreign Application Priority Data

Dec. 24, 1985 [DE] Fed. Rep. of Germany ........ 3546103

[51] Int. Cl.[4] ........................... B60P 1/02; B65G 7/02
[52] U.S. Cl. .................................. 414/495; 254/89 H; 248/179; 414/589
[58] Field of Search ............. 414/495, 589, 590; 254/89 H; 248/179, 276

[56] References Cited

U.S. PATENT DOCUMENTS 3,612,312 10/1971 Behrmann ..................... 414/498 X
3,743,044 7/1973 Scheele ........................ 414/495 X
4,036,377 7/1977 Weber .......................... 180/116 X

FOREIGN PATENT DOCUMENTS 1123972 2/1962 Fed. Rep. of Germany .
1101973 6/1965 Fed. Rep. of Germany .
2926028 2/1981 Fed. Rep. of Germany .
2416642 4/1981 Fed. Rep. of Germany .
2539098 3/1983 Fed. Rep. of Germany .
1230953 5/1986 U.S.S.R. ...................... 414/495

Primary Examiner—Robert J. Spar
Assistant Examiner—Gary A. Cundiff
Attorney, Agent, or Firm—Spencer & Frank

[57] ABSTRACT

Device for transporting load units consisting of a drive system carrier to which two track-laying drive systems are linked. A lifting platform is supported opposite the drive system carrier over several longitudinally adjustable lifting elements, so that said elements are at least partially provided with articulations movable in all directions, both in the region of the lifting platform and also in the region of the drive system carrier, so as to ensure the displacement in all directions of the lifting platform.

3 Claims, 1 Drawing Sheet

APPARATUS FOR TRANSPORTING LOADS

BACKGROUND OF THE INVENTION

Field of the Invention

The invention relates to an apparatus for transporting load units, particularly for relocating belt drive stations by means of a drive system. In order to lift the load, the drive system can be driven into a free space between the load and the ground and a lifting platform is raised until it lies against a load supporting face which forms the upper limit of the free space by means of a plurality of essentilly vertically extending lifting elements in the region of the drive system carrier.

DISCUSSION OF THE PRIOR ART

German Patent Document No. 2,416,642 and German Patent document No. 2,539,098 disclose devices for transporting a load unit, particularly for moving belt drive stations in surface mining operations. These devices are composed of a drive system which is moved into a free space of the load unit so as to lift the load unit. A lifting platform is provided with a plurality of lifting elements extending between the lifting platform and the drive system carrier. These lifting elements are arranged in such a manner that their center lines form the edges of a prism. By means of centering body formed by a stub shaft, the lifting platform is rotatable with respect to the drive system carrier about a perpendicular axis disposed within the prism. This centering element is guided in the perpendicular direction so as to be displaceable and fixable with respect to a cylinder disposed within the drive system carrier. On the one hand, the lifting platform can be locked with the load unit and, on the other hand, is connected with the centering element by means of a ball bearing. In this structural configuration, the drive system moves into the free space, which customarily extends transversely to the load unit. By means of the liftig elements which are disposed approximately in the corner regions of the lifting platform, the latter is raised until it lies against the supporting face and is then locked to the load unit by means of clamps or the like. Then the pistons of the lifting cylinders are moved in so that the tracked vehicle is connected with the load until only by the cylinder equipped with the stub shaft. Now the tracked vehicle can be turned about the longitudinal axis of the stub shaft in any desired direction of travel by moving the tracks in opposite directions.

The drawback noted here is that a plurality of working steps are required to bring the load unit into its direction of travel. Moreover, the orienting and raising functions are separated in a complicated manner and simultaneously involve a complicated structural configuration. Another drawback is that if the lifting platform is inclined due to the rigid lifting elements being raised to different heights, unintended forces are introduced into the lifting elements which result from the changing distances (hypotenuse) between the lifting elements. Considered over a longer period of time, these unintentional forces lead to damages which, under certain circumstances, may cause the transporting means to prematurely malfunction.

SUMMARY OF THE INVENTION

It is an object of the present invention to provide a device for transporting loads which realizes movement (displacement) in different directions of the lifting platform with respect to the drive system carrier, while at the same time, excluding the disadvantageous relative movements between lifting elements which are fixedly clamped to the drive system carrier and the lifting platform. Another object of the present invention is to simplify the configuration of the apparatus by omitting the pin found in known devices.

This is accomplished according to the invention in that, in the region of the lifting platform as well as in the region of the drive system carrier, at least some of the lifting elements are provided with joints or connections that allow movement of the lifting elements in many directions. This mutually independent mobility of the individual lifting elements ensures displacement of the lifting platform in all directions without the stub shaft required in the prior art still being necessary.

Thus the lifting elements perform the lifting function as well as the tilting movement of the lifting platform. The drive system continues to move as before into the free space of the load unit and sets itself into an approximately centered position in the free space by - depending on the direction of travel - rotating the tracks in opposite directions for a correction procedure. Actuation of the lifting elements causes the lifting platform to lie against the supporting face. No unintentional forces exist any longer since the changes in length which occur due to the different lifting heights of the individual lifting elements are automatically compensated by the articulated mounting. Damage to components is thus substantially avoided. Compared to the prior art, the structural configuration is simplified, thus also resulting in a reduction of costs.

Preferably, in the region of the lifting platform, all lifting elements are provided with joints such that the lifting elements are movable in all directions on one side of a plane defined by the lifting platform to thus ensure optimum displacement of the lifting platform. In a device having a plurality of lifting elements which are arranged in such a manner that their center lines form the edges of a prism, it is proposed, according to a further idea of the invention, to provide one lifting element of rigid configuration in the region of the drive system carrier and a lifting element which lies diagonally opposite thereto that is pivotal about a horizontal axis. Preferably, the lifting element in question is pivotal in the direction of the diagonal, i.e. in the direction of the rigid lifting element. All further lifting elements, however, are mounted in the drive system carrier so as to be pivotal in all directions, to thus optimally cover all directions of motion.

BRIEF DESCRIPTION OF THE DRAWINGS

The invention is illustrated in the drawing figures and will be described below as follows.

DESCRIPTION OF THE PREFERRED EMBODIMENTS

Figure 1:
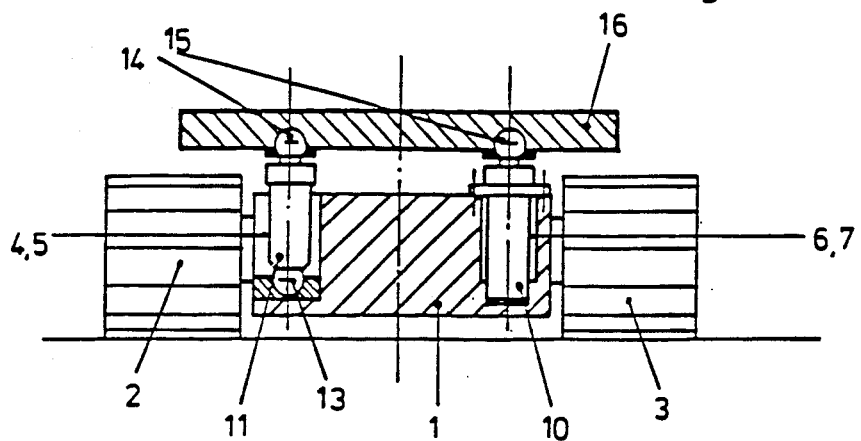
FIG. 1 is a sectional view of a device for transporting load units.
Figure 2:
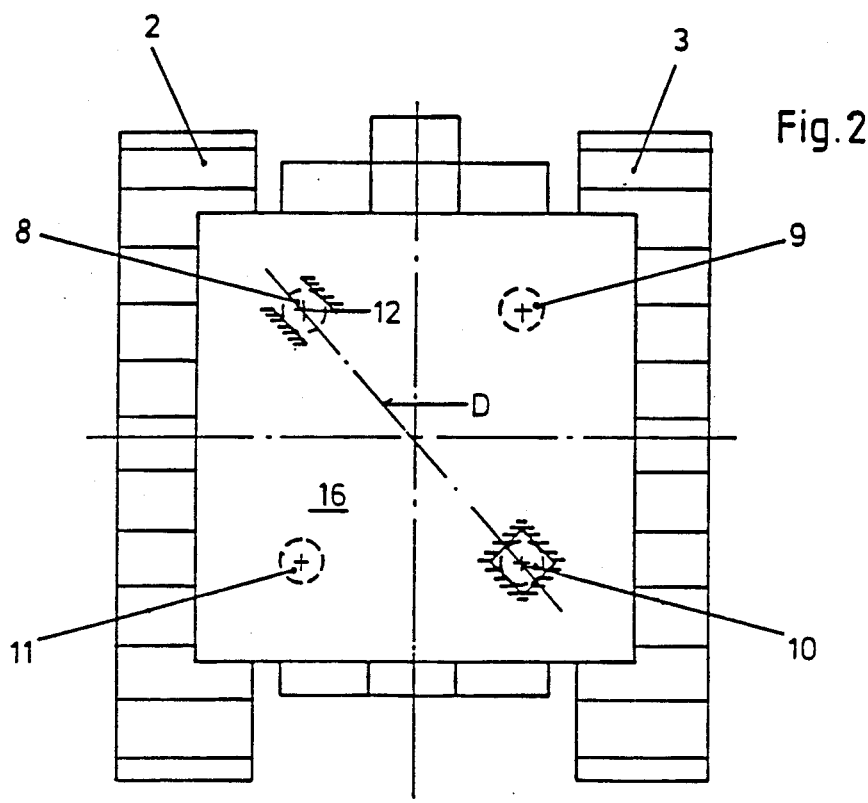
FIG. 2 is a top view of the device shown in FIG. 1.

FIGS. 1 and 2 show a transporting device (load crawler) which can be used, in particular, to transport a belt drive station (not shown). The transporting device is composed of a drive system carrier (1), to which two track laying gears (2, 3) are articulated. In the region of the drive system carrier, a plurality of perpendicularly extending receses (4, 5, 6 and 7) are provided which each serve to accommodate one lifting element (8, 9, 10 and 11). Lifting element (10) is rigid and lifting element (8), which lies diagonally opposite thereto, is pivotal about a horizontal axis (12) in the direction of the diagonal (D). The other two lifting elements (9 and 11) are mounted so as to be pivotal with respect to the drive system carrier (1) in all directions by way of joints (13). In the region of their ends (piston rods) facing away from the drive system carrier (1), the lifting elements (8 to 11) are all provided with joints (14, 15) which articulatedly support a lifting platform (16). Due to the partially articulated and partially longitudinally displaceable mounting of the lifting platform (16) with respect to the drive system carrier (1), displacement of the lifting platform (16) in many angles is possible. changes in length due to differences in the lifting heights of the individual lifting elements (8 to 11) are automatically compensated without the generation of unintentional forces.

We claim:

1. An apparatus for transporting load units and for relocating belt drive systems, comprising:

a drive system means for moving said apparatus, said drive system means including a drive system carrier;

a lifting platform;

a plurality of substantially vertically extending lifting elements, each of said lifting elements extending between said lifting platform and said drive system carrier;

a plurality of upper connecting means for connecting the end of each of said lifting elements adjacent said lifting platform to said lifting platform and allowing movement of each of said lifting elements in all directions on one side of a plane defined by said lifting platform;

a first lower connecting means for connecting the end of one of said lifting elements adjacent said drive system carrier to said drive system carrier, said first lower connecting means forming a rigid connection between said one of said lifting elements and said drive system carrier;

a second lower connecting means for connecting the end of another of said lifting elements adjacent said drive system carrier to said drive system carrier and allowing movement of said another of said lifting elements about a horizontal axis; and further lower connecting means for connecting the end of each remaining lifting element adjacent said drive system carrier to said drive system carrier.

2. An apparatus as defined in claim 1, wherein said second lower connecting means allows movement of said another of said lifting elements about a horizontal axis which extends through said one of said lifting elements and said another of said lifting elements.

3. An apparatus as defined in claim 1, wherein said further lower connecting means allows movement of each remaining lifting element in all directions on one side of a plane defined by said drive system carrier.

* * * * *